(12) United States Patent
Weigand et al.

(10) Patent No.: US 12,351,202 B2
(45) Date of Patent: Jul. 8, 2025

(54) TRAFFIC SITUATION-DEPENDENT CONTROL OF A VIRTUAL REALITY DEVICE

(71) Applicant: AUDI AG, Ingolstadt (DE)

(72) Inventors: Christoph Weigand, Gaimersheim (DE); Stefan Mayer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 265 days.

(21) Appl. No.: 17/922,159

(22) PCT Filed: Apr. 19, 2021

(86) PCT No.: PCT/EP2021/060064
§ 371 (c)(1),
(2) Date: Oct. 28, 2022

(87) PCT Pub. No.: WO2021/219414
PCT Pub. Date: Nov. 4, 2021

(65) Prior Publication Data
US 2023/0174090 A1    Jun. 8, 2023

(30) Foreign Application Priority Data

Apr. 30, 2020  (DE) .................... 10 2020 111 827.9
Jul. 7, 2020   (DE) .................... 10 2020 117 852.2

(51) Int. Cl.
*B60W 50/14*    (2020.01)
*G06F 1/16*     (2006.01)

(52) U.S. Cl.
CPC ............. *B60W 50/14* (2013.01); *G06F 1/163* (2013.01); *B60W 2050/146* (2013.01)

(58) Field of Classification Search
None
See application file for complete search history.

(56) References Cited

U.S. PATENT DOCUMENTS

2017/0113702 A1* 4/2017 Thieberger-Navon ..................... B60W 50/0097

FOREIGN PATENT DOCUMENTS

| DE | 10 2016 213 916 A1 | 2/2018 |
|----|--------------------|--------|
| DE | 10 2017 211 520 A1 | 1/2019 |
| DE | 10 2019 002 664 A1 | 11/2019 |
| EP | 3 079 041 A1       | 10/2016 |

OTHER PUBLICATIONS

Chinese Office Action dated Feb. 24, 2025 in parallel Chinese Application No. 202180031859.7.

* cited by examiner

*Primary Examiner* — Lail A Kleinman
(74) *Attorney, Agent, or Firm* — STAAS & HALSEY LLP

(57) ABSTRACT

A method of controlling a VR device, in particular VR goggles, of a user in a vehicle interior of a vehicle via a communication link, includes vehicle data being received and evaluated, or receiving evaluated vehicle data via the communication link. At least one traffic event may be classified based on the evaluated vehicle data, to generate control commands for controlling the VR device, by way of which the user of the VR device may be alerted to a response of the vehicle to the traffic event, which may be unpredictable to the user. The examples further relate to a vehicle arrangement.

7 Claims, 1 Drawing Sheet

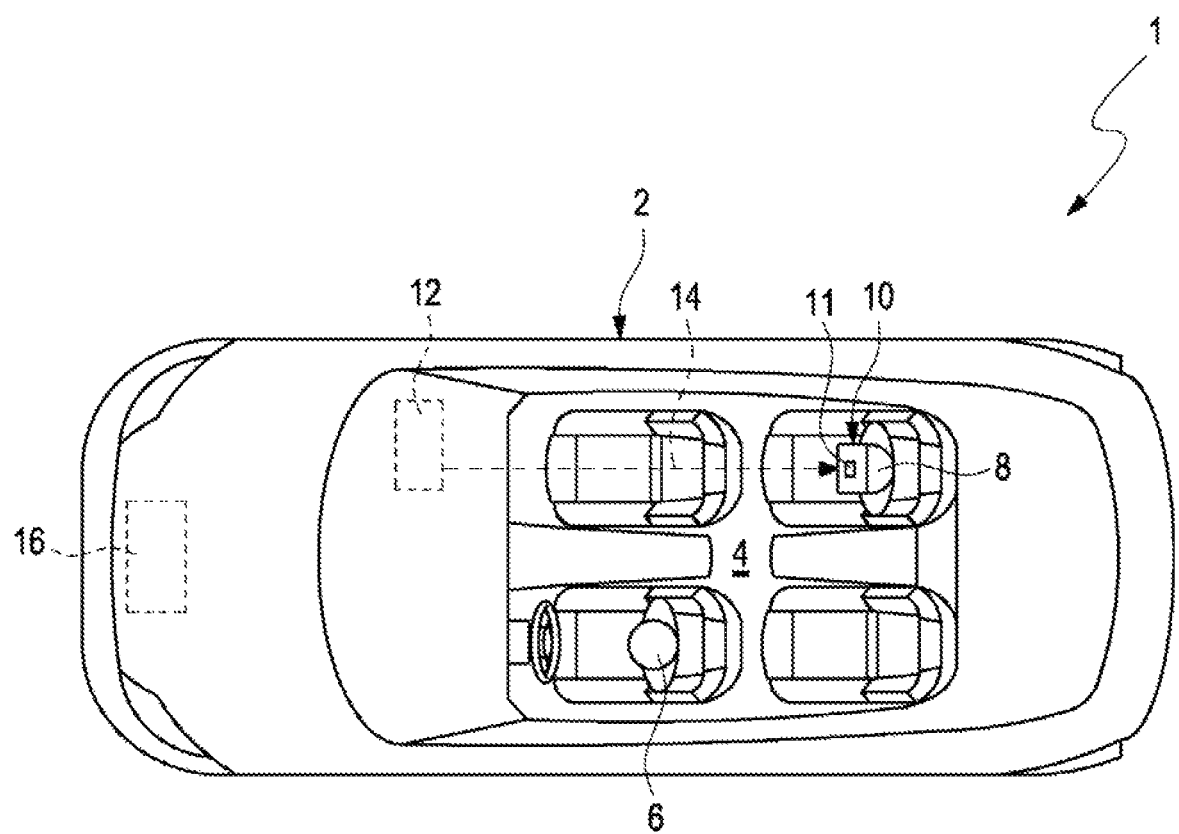

TRAFFIC SITUATION-DEPENDENT CONTROL OF A VIRTUAL REALITY DEVICE

CROSS REFERENCE TO RELATED APPLICATIONS

This application is a U.S. national stage of International Application No. PCT/EP2021/060064, filed on Apr. 19, 2021. The International Application claims the priority benefit of German Application No. 10 2020 111 827.9 filed on Apr. 30, 2020 and German Application No. 10 2020 117 852.2 filed on Jul. 7, 2020. Both the International Application and the German Applications are incorporated by reference herein in their entirety.

FIELD

The invention relates to a method for controlling a VR device, in particular VR goggles, of a user in a vehicle interior of a vehicle via a communication link, and to a vehicle arrangement.

BACKGROUND

Various theoretical applications for virtual reality headsets or VR devices in the automotive sector are known which are currently being developed. For example, programming libraries are known that allow VR media format developers to tailor this content to vehicle movements. By implementing the vehicle movement in the output of the VR media formats, a more intensive immersion of the user of the VR device can be achieved. Furthermore, the inclusion of the vehicle movement can result in minimization of the tendency to motion sickness.

When using a VR device in the vehicle, the user is shielded from what is happening inside and around the vehicle. On the one hand, this enhances the immersive experience, and on the other hand, the user of the VR device is also disconnected from significant incidents in the vehicle. For example, the user cannot directly perceive an impending accident situation in the vehicle or adapt to the impending accident situation. This may shock or surprise the user of the VR device.

SUMMARY

The described examples provide a method and a vehicle arrangement that protects a user of a virtual reality device from being shocked or surprised.

The described example may be according to a method having the features recited in the claims and a vehicle arrangement recited in the claims. Further configurations and extensions may be obtained from the dependent claims.

The method according to the examples is used to control a VR device, in particular VR goggles, of a user in a vehicle interior via a communication link. In the method according to the examples, vehicle data is received and evaluated, or already evaluated vehicle data is received via the communication link. On the basis of the evaluated data, at least one traffic effect is classified, and control commands for controlling the VR device are generated which alert the user of the VR device to a response of the vehicle to the traffic event that is unpredictable to the user.

The method can be used to implement a transfer of specific information from the vehicle to the VR device and display the same. For example, a data channel between the vehicle and the VR device can be used that allows for motion compensation when using the VR device. For example, the data channel can be used on a wireless or wired communication technology such as WLAN, Bluetooth, NFC, radio, infrared, Ethernet, USB and the like.

For example, the VR device can be designed as a virtual reality headset. VR media content can be output via at least one display integrated into the virtual reality headset or via a portable device such as a smartphone inserted in the virtual reality headset. The VR device can also comprise headphones, camera sensors, microphones and the like to optimize the immersion of the user.

The communication link can be based on a wireless transmission standard, such as Bluetooth, and can be implemented between an on-board control unit and the VR device. The data-carrying coupling of the VR device with the vehicle allows the user to be provided with an immersive VR experience as before. The method according to the examples allows the user to be informed about important incidents in and around the vehicle. This allows the VR device to respond to traffic events to prevent the user of the VR device from being shocked. The method can therefore increase the convenience of using VR media content while driving.

The at least one traffic event can be defined or classified based on vehicle signals or vehicle data. The vehicle data can also be made available indirectly to the user of the VR device in the vehicle to enable traffic situation-dependent control of the VR device.

Traffic events, such as impending rear-end collisions or successful detection of pedestrians, are already registered on the vehicle by control units before the vehicle responds. The corresponding evaluation results can be transmitted to the VR device in the form of evaluated vehicle data or directly in the form of control commands. In this way, on-board agents that access the on-board sensor system can be used to control the VR device. Alternatively or in addition, the VR device can evaluate the vehicle data.

According to one exemplary embodiment the control commands are generated to output a message in a display of the VR device, to activate a transparency of the VR device, to output an acoustic or graphical notification, to pause or terminate an application of the VR device and/or to suspend a noise canceling function. This can generate a notification to the user of the VR device, which avoids shocking the user.

The message on the display of the VR device can take the form of a warning or an alert. Acoustic, haptic and/or visual messages and/or notifications can be output by the VR device in response to the generated control commands.

In another embodiment the user of the VR device is alerted to a response of the vehicle to the traffic event in the form of an activation of an emergency braking assistant, an evasive maneuver of the vehicle, an arrival at or approach to a destination, a triggered fatigue detection, or an object detected by a vehicle sensor system. In the case of such traffic events, the vehicle may respond by initiating a braking maneuver or an evasive maneuver, which is suddenly perceived by the user of the VR device without warning. The method allows the user of the VR device to be taken into consideration and notified in advance of such vehicle responses. This type of control of the VR device allows the user to be alerted or to adjust to the impending response of the vehicle, thus increasing the user's driving comfort.

If the driver is identified as tired by a fatigue detection system in the vehicle, the user of the VR device can be alerted directly or indirectly, for example, so that he/she can help to keep the driver of the vehicle awake and active. For example, media offerings might be suggested to the user of the VR device that require collaboration with another non-VR user, such as the driver or another vehicle passenger. For example, such VR media content may be designed as a quiz.

The user of the VR equipment can be a vehicle passenger who is sitting on a rear seat or a passenger seat inside the vehicle. The vehicle can be controlled either automatically, semi-automatically or manually by a driver. The user of the VR device may be excluded from the control of the vehicle.

According to a further exemplary embodiment, control commands for controlling the VR device are generated, which signal a requirement of a vehicle passenger to communicate with the user of the VR device.

In a further embodiment the requirement of the vehicle passenger to communicate with the user of the VR device is initiated by an on-board input by the vehicle passenger.

If a communication requirement exists, at least one vehicle passenger can provide an input via a media controller of the vehicle in order to notify the user of the VR device discreetly of this communication requirement. This can be implemented, for example, by activating a button in a graphical interface of the media controller, by pressing a button or by using a voice-assisted vehicle assistant.

The user of the VR device can receive a notification via the communication link. The notification of or alert to the communication requirement can be displayed as a text message in the VR device, played back via headphones as a voice message, or signaled as a deactivation of the noise cancellation in the headphones. Unlike a direct contact, for example by touch, with the user of the VR device, the indirect communication with the vehicle via the communication link can prevent the user of the VR device from being shocked.

According to a further exemplary embodiment, the control commands for controlling the VR device are generated by an on-board control unit and/or by a processor unit of the VR device. This measure allows the calculation of the control commands and the classification of the at least one traffic event to be carried out either within the vehicle or by the VR device. In particular, calculation results already carried out by the vehicle, warnings, and calculations can be used by the VR device to reduce the power consumption of the VR device and increase the battery life of the VR device.

According to a further embodiment, vehicle data and/or evaluated vehicle data are transmitted between the on-board control unit and the VR device via a communication link designed as a Bluetooth link or a WLAN link. This measure can be used to construct a communication link based on different wireless transmission standards, which enables transmission of vehicle data for driving dynamics-dependent VR experiences.

The communication link can be implemented as a bidirectional data channel between the vehicle or on-board control unit and the VR device. The corresponding communication link can be based on one or more vehicle-internal or vehicle-external transmission technologies, such as Bluetooth, WLAN, LTE, 5G and the like.

The vehicle arrangement according to the examples may include a vehicle with an on-board control unit and at least one VR device. The vehicle arrangement is to carry out the method according to the described examples.

The vehicle arrangement allows the use of VR equipment, such as VR goggles or VR headsets, on a rear seat or a passenger seat of the vehicle, regardless of whether the driving is automated or manually controlled. The user of the VR device can be alerted to an unpredictable response of the vehicle to a traffic event, in order to avoid shocking or surprising the user and to increase the driving comfort for the user.

BRIEF DESCRIPTION OF THE DRAWINGS

These and other aspects and advantages will become more apparent and more readily appreciated from the following description of examples, taken in conjunction with the accompanying drawings, where like reference numerals refer to like elements throughout:

A FIGURE shows a vehicle arrangement according to an example.

DETAILED DESCRIPTION

The FIGURE shows a vehicle arrangement 1 according to an example. The vehicle arrangement 1 comprises a vehicle 2 which can be an automatically operable or manually controlled vehicle. As an example, two vehicle passengers 6, 8 are located in a vehicle interior 4 of the vehicle 2.

A first vehicle passenger 6 is a driver of the vehicle 2. A second vehicle passenger 8 is wearing a virtual reality headset or a VR device 10. The second vehicle passenger 8 is therefore a user 8 of the VR device 10. The first vehicle passenger 6 is a so-called Non-VR user.

Between an on-board control unit 12 and the VR device 10, a data-carrying communication link 14 is established, which is based on a Bluetooth transmission standard, for example. Vehicle data can be received and evaluated, or evaluated vehicle data can be received, via the communication link 14. The vehicle data can be obtained or received, for example, by a vehicle sensor system 16. In addition, information from route guidance in the form of vehicle data can be taken into account.

The vehicle sensor system 16 can comprise, for example, camera sensors, LIDAR sensors, radar sensors and the like.

Based on the evaluated vehicle data, the on-board control unit 12 or a processor unit 11 of the VR device 10 can be used to classify a traffic situation or a traffic event. Based on the traffic event, a response of the vehicle 2 to the traffic event can be estimated.

For example, critical driving situations can be classified as possible traffic events. In critical driving situations, a safe distance of the vehicle 2 is undershot, thus initiating an evasive maneuver or an emergency braking maneuver. Such driving maneuvers can be initiated automatically by the on-board control unit 12 or by an emergency braking assistance function, or by the driver 6. The corresponding driving situation can often be determined in advance using the vehicle sensor system 16.

After a classification of the traffic event, control commands for controlling the VR device 10 are generated in order to alert the user 8 of the VR device 10 of a response of the vehicle 2 or the driver 6 to the traffic event that is unpredictable to the user 8, and to avoid shocking the user 8. To do this, a warning message can be displayed in the VR display of the VR device 10 by the generated control commands Depending on configuration of the VR device 10, a See-Through function can be activated by the generated control commands. To position the VR device 10 in space, some VR devices 10 have camera systems which can be used to detect and evaluate the surroundings. A See-Through function displays the video stream of such a camera system instead of the VR display, to allow the user 8 a view behind the VR device 10. The See-Through function can therefore be activated and deactivated according to the traffic situation in order to prepare the user 8 for possible responses of the vehicle 2.

In another exemplary traffic event, the vehicle 2 can reach a destination. This can be registered based on vehicle data in the form of navigation data. When approaching the destination, a corresponding warning can be displayed in the VR device 10, so that the user 8 can prepare to end the VR usage.

LIST OF REFERENCE SIGNS

1 vehicle arrangement
2 vehicle
4 vehicle interior
6 first vehicle passenger/driver
8 second vehicle passenger/user of the VR device
10 VR device/virtual-reality headset
11 processor unit of the VR device
12 on-board control unit
14 communication link
16 vehicle sensor system A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

The invention claimed is:

1. A method of controlling a virtual reality (VR) device of a user in a vehicle interior of a vehicle via a communication link, the method comprising:
    obtaining evaluated vehicle data via the communication link;
    classifying at least one traffic event on basis of the evaluated vehicle data; and
    generating control commands to control the VR device to signal a requirement of a vehicle passenger to communicate with the user of the VR device so as to alert the user of the VR device to a response of the vehicle to the at least one traffic event.

2. The method as claimed in claim 1, wherein the control commands control outputting a message in a display of the VR device, activating a transparency of the VR device, outputting an acoustic or graphical notification, pausing or terminating an application of the VR device and/or suspending a noise cancelling function.

3. The method as claimed in claim 1, wherein the at least one traffic event includes an activation of an emergency braking assistant, an evasive maneuver of the vehicle, an arrival or approach to a destination, a triggered fatigue detection, or an object detected by a vehicle sensor system.

4. The method as claimed in claim 1, wherein the requirement of the vehicle passenger is initiated by an on-board input by the vehicle passenger.

5. The method as claimed in claim 1, wherein the generating includes generating, by an on-board control unit and/or by a processor unit of the VR device, the control commands to control the VR device.

6. The method as claimed in claim 5, wherein the obtaining includes wirelessly transmitting the evaluated vehicle data between the on-board control unit and the VR device via a communication link.

7. A vehicle, comprising:
    an on-board control unit configured to establish a communication link with a virtual reality (VR) device that includes a computer processor, to carry out a process of controlling the VR device via the communication link with the on-board control unit of the vehicle, the process by the VR device including,
    obtaining evaluated vehicle data from the on-board control unit via the communication link;
    classifying at least one traffic event on basis of the evaluated vehicle data; and
    generating control commands to control the VR device to signal a requirement of a vehicle passenger to communicate with a user of the VR device so as to alert the user of the VR device to a response of the vehicle to the at least one traffic event.

\* \* \* \* \*